May 21, 1935.   A. SMITH   2,001,894
SCRUB BUCKET DOLLY
Filed June 2, 1934
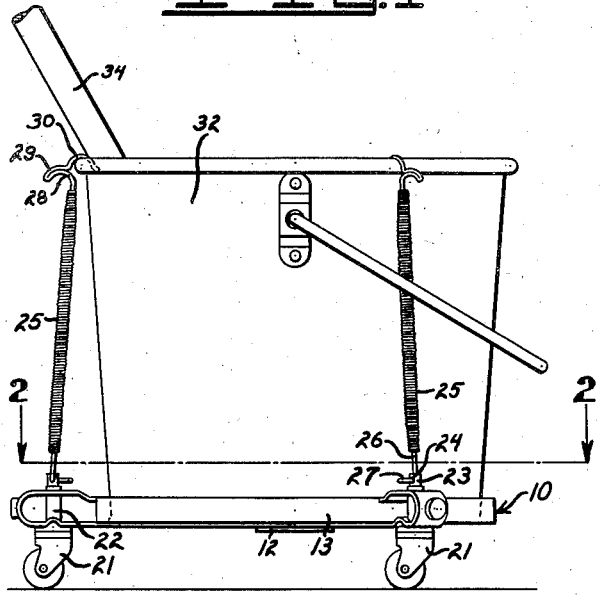
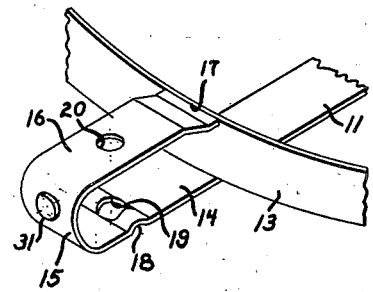
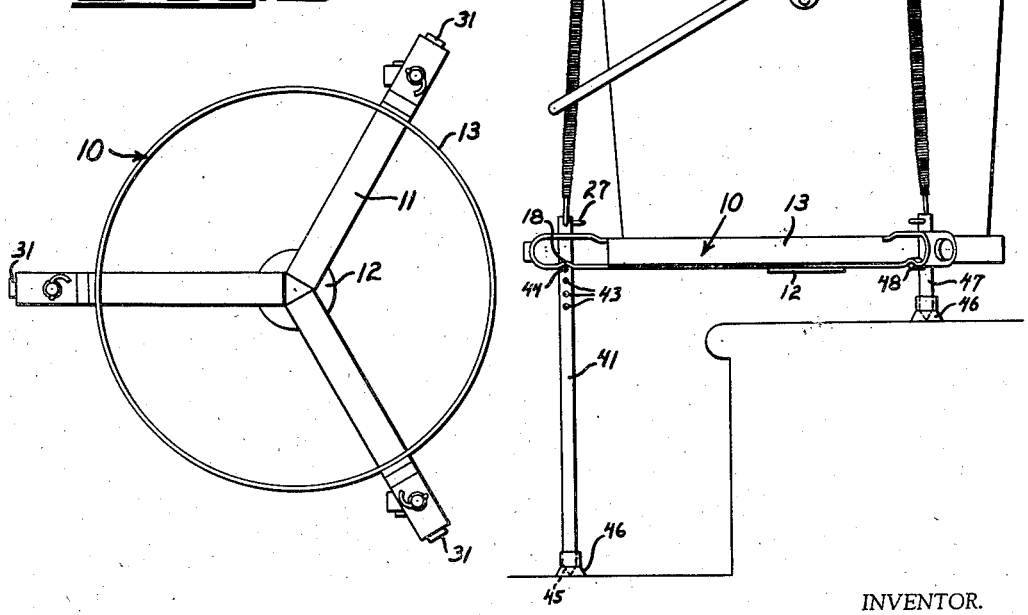
INVENTOR.
ARTHUR SMITH
BY
ATTORNEY.

Patented May 21, 1935

2,001,894

UNITED STATES PATENT OFFICE 2,001,894

SCRUB BUCKET DOLLY

Arthur Smith, Pasadena, Calif.

Application June 2, 1934, Serial No. 728,731

5 Claims. (Cl. 280—61)

This invention relates to a scrub bucket dolly.

The general object of the invention is to provide an improved portable dolly which allows a scrub bucket or other articles to be moved about from place to place while at the same time the construction is sturdy so that there is no danger of water slopping out of the scrub bucket.

A more specific object of my invention is to provide a dolly for a scrub bucket or other use having a base with a plurality of casters mounted thereon in a novel manner.

Another object is to provide a dolly with novel means for supporting the bucket on the dolly.

Other objects and the advantages of my invention will be apparent from the following description taken in connection with the accompanying drawing, wherein:

Fig. 1 is a side elevation showing my improved scrub bucket dolly with a bucket mounted thereon;

Fig. 2 is a section taken on line 2—2 of Fig. 1;

Fig. 3 is a fragmentary perspective view; and,

Fig. 4 is a side elevation showing the dolly supported on a step, or roof.

Referring to the drawing by reference characters I have shown my invention as embodied in a scrub bucket dolly which is indicated generally at 10. As shown the scrub bucket dolly includes a base which is made of a plurality of radial members 11 which are shown as connected to a center member 12 and near the outer ends of the radial members, I provide a cylindrical rim member 13. The members 11 may be suitably welded to the center 12 and these members may be welded to the bottom edge of the rim 13.

The radial members 11 project beyond the rim 13 as indicated at 14, and then extend upwardly in a curved portion 15 and thence inwardly as at 16 and the free ends are welded as at 17 to the outside edge of rim 13.

The portion 14 of the rim members is provided with an indentation 18 in which an aperture 19 is arranged. This aperture 19 is in alignment with an aperture 20 in the upper portion 16. A caster member indicated at 21 is provided with a shank 22 which extends through the apertures 19 and 20 and which has an upper portion 23 through which an aperture 24 extends.

To hold a bucket in the dolly I provide a clamping means shown as springs 25 having at one end lower members 26 which have a hook 27 each of which is removable so that it can be placed in and removed from its aperture 24 while at the upper end the springs 25 each have a fastening member 28 which includes a finger engaging hook 29 in a bucket engaging hook 30.

The curved portion 15 may be provided with suitable bumpers 31 which may be made of rubber or other suitable material.

In use a bucket 32 is placed on the dolly as formed and the caster shanks 22 are inserted through the apertures 19 and 20. The hooks 27 on the springs 25 are then passed through the apertures 24 whereupon the operator places a finger in the hooks 29 and strains the spring until the hook 30 passes over the rim of the bucket after which the springs engage the bucket rim and the bucket is held firmly in place.

The operator may then move the bucket about without danger of spilling or slopping the contents and the mop handle 34 may be used to move the bucket.

For use on stairs I show a support in Fig. 4. In this construction the dolly 10 is in all respects similar to the one previously described but instead of casters I show a front support 41 which is a metal rod having a perforation in its upper end to receive the hook 27 and having spaced perforations 43 through one of which a pin 44 passes. This pin 44 engages the groove 18 to prevent turning of the support. The lower end of the support is sharpened as at 45 and is fitted with a rubber knob 46 which may be used in certain cases. The two rear supports are indicated at 47 and are similar to the front support except that they are shorter and the adjustable apertures 43 are omitted and only a single aperture is provided through which a pin 48 is passed. When stairs are to be scrubbed the hooks are released from the casters and the casters are withdrawn and the supports 41 and 47 are inserted in place. If the stairs are of such a nature that a sharpened point is desired the rubber members 47 are removed but are replaced when the requirements are such that a sharpened member should not be used.

From the foregoing description it will be apparent that I have invented an improved scrub bucket dolly which is extremely sturdy and which is highly efficient in use and which can be economically manufactured.

Having thus described my invention, I claim:

1. In a scrub bucket dolly, a base including a rim hoop member and a plurality of arms engaging the lower edge of said rim member, each of said arms terminating in a U-shaped end, the upper portion of said ends engaging the top of said hoop, the lower portion of said U-shaped ends having an aperture, the upper portion of said ends having an aperture in alignment with said first aperture, a caster having a base, said caster base engaging the lower portion of said U-shaped end, the caster including a shank fitting said aligned apertures and bucket engaging means on said shank.

2. In a scrub bucket dolly, a base including a cylindrical rim member, a plurality of arms engaging the lower edge of said hoop member, said arms terminating in a U-shaped end, the upper portion of said ends engaging the top of said rim, the lower portion of said ends engaging the top of said band, the lower portion of said ends having each an aperture, the upper portion of said ends each having an aperture in alignment with said first apertures, a plurality of casters each having a base engaging the lower portion of an end, the casters each including a shank fitting said apertures, spring members each including a portion at one end engaging said shanks, said spring members at the other end each having a hook.

3. In a scrub bucket dolly, a base including a cylindrical rim member and a plurality of radial arms engaging the lower edge of said rim member, each of said arms terminating in a U-shaped end, the upper portion of said ends engaging the top of said hoop, the lower portion of said U-shaped ends having a groove therein and having an aperture passing through said groove, the upper portion of said ends having an aperture in alignment with said first aperture, a caster having a base, said caster base engaging the lower portion of said U-shaped end, the caster including a shank fitting said aligned apertures and a spring member having one end engaging said shank aperture, said other end of the hook having bucket engaging means thereon.

4. In a scrub bucket dolly, a base including a cylindrical rim member and a plurality of radial arms engaging the lower edge of said rim member, each of said arms terminating in a U-shaped end, the upper portion of said ends engaging the top of said hoop, the lower portion of said U-shaped ends having a groove therein and having an aperture passing through said groove, the upper portion of said ends having an aperture in alignment with said first aperture, a caster having a base, said caster base engaging the lower portion of said U-shaped end, the caster including a shank fitting said aligned apertures, said shank having a transverse aperture therein, a spring member including a finger portion at one end engaging said shank aperture, said spring member having a handle member at the other end and having a hook adjacent the handle member.

5. In a scrub bucket dolly, a base including a cylindrical rim member and a plurality of arms extending across said rim member and adapted to engage the bottom of a bucket, a plurality of arms projecting outwardly beyond said rim and on three sides thereof, each of said projecting arms having an aperture therein, a plurality of casters each having a base, each caster base engaging the lower portion of a projecting arm, each of the casters including a shank fitting the associated aperture, each of said shanks having a transverse aperture therein, a spring member including a transverse finger portion at the lower end engaging said shank aperture, said spring member having a hook at the upper end.

ARTHUR SMITH.